Dec. 14, 1926.  1,610,443
J. S. GREGORIUS
APPARATUS FOR MAKING SHEET GLASS
Filed May 24, 1926   2 Sheets-Sheet 1
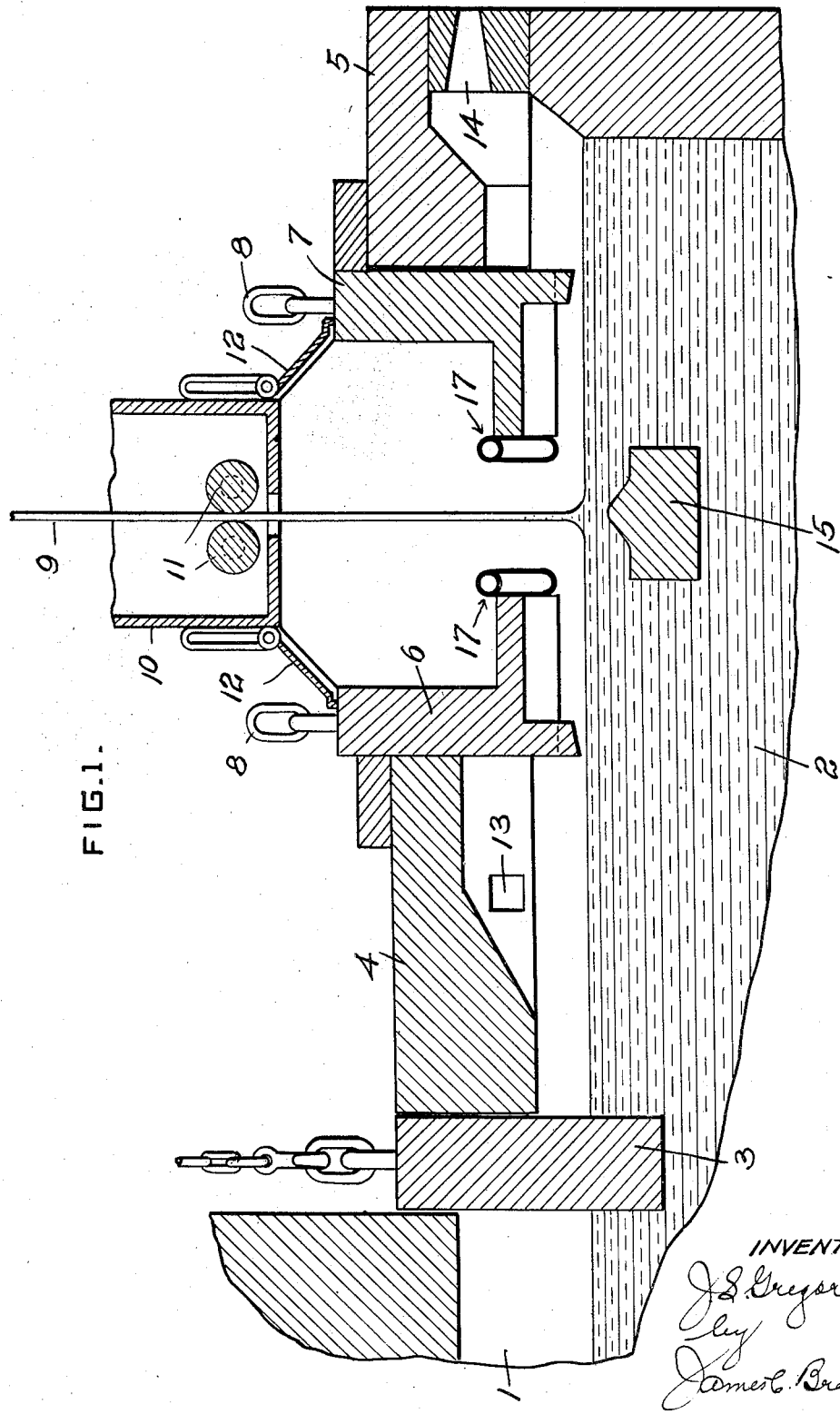
INVENTOR
J. S. Gregorius
by
James C. Bradley
atty.

Dec. 14, 1926.  
J. S. GREGORIUS  
1,610,443  
APPARATUS FOR MAKING SHEET GLASS  
Filed May 24, 1926    2 Sheets-Sheet 2
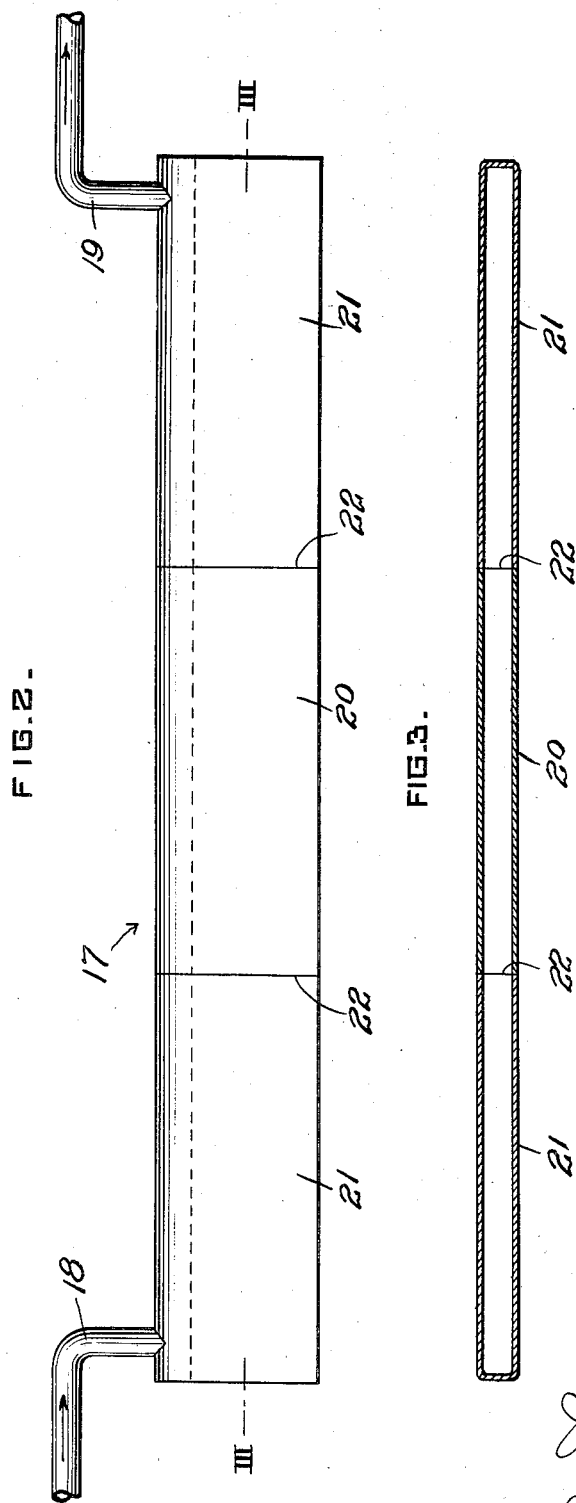
INVENTOR  
Joseph S Gregorius  
by  
James C. Bradley  
Atty.

Patented Dec. 14, 1926.

1,610,443

UNITED STATES PATENT OFFICE.

JOSEPH S. GREGORIUS, OF MOUNT VERNON, OHIO, ASSIGNOR TO PITTSBURGH PLATE GLASS COMPANY, A CORPORATION OF PENNSYLVANIA.

APPARATUS FOR MAKING SHEET GLASS.

Application filed May 24, 1926. Serial No. 111,104.

The invention relates to apparatus for making sheet glass. It has for its principal object the provision of improved cooling means, for use over the glass bath, adapted to give a graduated cooling effect. The glass bath, at its central portion, normally has a somewhat higher temperature than at its side portions, due to the greater dissipation of heat at the sides of the bath, incident to the conducting effect of the side walls of the tank. This tends to give the sheet, drawn from the bath, a center portion, which is thinner than the edges, such condition tending to cause a warping of the sheet and to increase the breakage. The present invention is designed to provide a simplified and improved form of cooler for giving a greater cooling effect upon the bath, and upon the sheet itself, at the center of such bath and of the sheet, than at the end portions, and thus promote the production of a sheet of more uniform thickness from edge to edge. Briefly stated, this is accomplished by the use of a cooler, formed of metal having different degrees of conductivity; the central portion being formed of a metal, such as copper, which has a greater conducting capacity than the end portions of the cooler, which are formed from a metal, such as steel. It will be understood, however, that the invention is not limited to the use of the particular metals above specified, the only requirement being that the central portion of the cooler be constructed of a metal having a higher degree of conductivity than the metal from which the end portions of the cooler are constructed. One embodiment of the invention is illustrated in the accompanying drawings in which:

Figure 1 is a longitudinal section through a glass tank with the invention applied thereto. Figure 2 is a side elevation of the cooling device taken by itself. And Fig. 3 is a longitudinal section through the cooling device on the line III—III of Fig. 1.

Referring to the general arrangement of Fig. 1, the reference numeral 1 indicates the end of a glass melting tank, preferably of the regenerator type, and 2 is a forehearth or drawing tank, leading from the end of the melting tank. A gate 3 of refractory material is employed for partially segregating the glass in the tank 1 from that in the tank 2. A cover for the tank is provided in the form of the refractory blocks or plates 4, 5, 6 and 7, the latter being L-shaped in cross section and being supported from above by means of the chains 8, 8 so that they may be adjusted relatively to the surface of the bath in the tank. A drawing opening is left between the members 6 and 7, through which the sheet 9 is drawn upwardly through a leer 10. Any desired form of drawing means may be employed, the one illustrated being a series of pairs of rolls 11, mounted in the leer and engaging the sides of the sheet, this being a well known means for drawing glass vertically. Suitable edge holding devices are provided at the edges of the sheet 9, but for simplicity in showing, these devices are not illustrated. The space beneath the leer is preferably closed in by means of the inclined metal plates 12, 12 resting at their lower edges upon the members 6 and 7. Heat is applied to the tank 2 by means of gas burners directed through the openings 13 and 14 in the walls of the tank. A refractory draw-bar 15 is also preferably employed extending below the line of generation of the sheet 9.

On each side of the glass sheet and spaced above the surface of the bath is a cooling member 17. These cooling members extend from one side of the tank to the other and are constructed in the form of a hollow metal shell, as indicated more specifically in Figs. 2 and 3. These members are cooled by means of a circulation of water therethrough, this being accomplished by means of an inlet pipe 18 and an outlet pipe 19. As indicated in Fig. 3, the shell 17 is made in three sections, namely, a central section 20 and a pair of end sections 21, 21, the sections being brazed together along the lines 22, 22. The end sections 21, 21 are preferably made of sheet steel, while the central section 20 is made of sheet copper. The copper has a heat conducting capacity several times that of steel, so that when water is circulated through the shell, the central section 20 absorbs more heat from the glass bath and from the glass sheet itself than does the end sections 21, 21. As a result, the cooling device gives a greater cooling effect at the center of the bath than it does at the sides of the bath. The result is to give a sheet which is somewhat thicker at the center than would otherwise be the case, thus neutralizing the tendency of the sheet to draw thin at the center incident to the condition that the bath is normally hotter at the center than at the sides. While the sections of the shell are preferably made of copper and steel, as these metals constitute the most available ones having the desired difference in conductivity, the same result may be secured by using different combinations of metals, the essential requirement being that the central section of the cooling device shall be of a material having a higher degree of conductivity than that of the end sections. The invention is also not limited to coolers of the cross section shown in the drawings, as this cross section may be varied to meet requirements and conditions.

What I claim is:

1. The combination with a receptacle for molten glass, and a drawing means thereover for drawing a glass sheet continuously from the bath, of a cooling device extending across the bath on each side of the sheet adjacent the surface of the bath, and comprising a hollow shell, such shell having its central portion formed from a material having a higher degree of conductivity than the material from which the end portions are formed, and means for circulating a cooling fluid through each of said shells.

2. The combination with a receptacle for molten glass, and a drawing means thereover for drawing a glass sheet continuously from the bath, of a cooling device extending across the bath on each side of the sheet adjacent the surface of the bath, and comprising a hollow shell of metal, such shell comprising a central section formed of a metal having a relatively high degree of conductivity, and end sections formed of a metal having a less degree of conductivity than that of said central section, and means for circulating a cooling fluid through each of said shells.

3. The combination with a receptacle for molten glass, and a drawing means thereover for drawing a glass sheet continuously from the bath, of a cooling device extending across the bath, on each side of the sheet adjacent the surface of the bath, and comprising a hollow shell of metal, such shell comprising a central section formed of copper and end sections formed of steel, and means for circulating a cooling fluid through each of said shells.

In testimony whereof, I have hereunto subscribed my name this 5th day of April, 1926.

J. S. GREGORIUS.